United States Patent [19]

Chen et al.

[11] Patent Number: 4,969,178

[45] Date of Patent: Nov. 6, 1990

[54] MULTIPURPOSE SUBSCRIBER LOCAL LINE MONITORING DEVICE

[75] Inventors: Ching-Phone Chen; Chao-Chiung Loao, both of Tao Yuang Hsien, Taiwan

[73] Assignee: Telecommunication Laboratories, Directorate General of Telecommunications, Ministry of Communications, Taiwan

[21] Appl. No.: 426,707

[22] Filed: Oct. 26, 1989

[51] Int. Cl.$^5$ .............................................. H04M 1/00
[52] U.S. Cl. ......................................... 379/33; 379/27
[58] Field of Search ....................... 379/26, 29, 32, 27, 379/33

[56] References Cited

FOREIGN PATENT DOCUMENTS 0239168 11/1985 Japan ..................................... 379/33

Primary Examiner—Stafford D. Schreyer
Attorney, Agent, or Firm—Wenderoth, Lind & Ponack

[57] ABSTRACT

This invention relates to a multipurpose subscriber local line monitoring device and more particularly to the one which uses a voltage detecting circuit, a current detecting circuit, two control circuits and a comparator circuit to detect breaking, short-circuit or illegal connection of the subscriber local line, and which uses an alarm circuit and a sound generating circuit to give an audio alarm signal to the subscriber when the subscriber local line fails to work.

4 Claims, 2 Drawing Sheets

MULTIPURPOSE SUBSCRIBER LOCAL LINE MONITORING DEVICE

BACKGROUND OF THE INVENTION

Telephone communication apparatus has now become a means requisite to the modern people for communication. Only through telephone communication apparatus the transmission of information, market report, and commercial transactions can be made simply, rapidly and efficiently. Since telephone communication apparatus has now become so important in our daily life, a telephone communication local line subscriber may suffer a loss if the telephone communication apparatus fails to work or the line is illegally connected by somebody else. The present invention is designed to provide a solution to said problems, that is, to provide a multipurpose subscriber local line monitoring device to monitor the operation of telephone apparatus so as to prevent against illegal connection of the line.

SUMMARY OF THE INVENTION

The present invention is related to a multipurpose subscriber local line monitoring device for monitoring breaking or short-circuit line failure of subscriber local line and detecting any illegal connection of the line, which is including a voltage detecting circuit, a current detecting circuit, a first control circuit, a second control circuit, a comparator circuit, an alarm circuit and a sound generating element. Through the monitoring of the voltage detecting circuit and the current detecting circuit, any line failure of subscriber local line will be detected, and the sound generating element will provide an acoustic alarm when any line failure is detected.

FEATURES OF THE INVENTION (1) Detection of breaking of subscriber local line: Audio alarm will be provided upon detection of line breaking.

(2) Detection of short-circuit of subscriber local line: Audio alarm will be provided upon detection of short-circuit of subscriber local line.

(3) Detection of illegal connection: Audio alarm will be provided upon detection of illegal connection of local line by other people.

(4) Identification of illegal connection at subscriber side from normal calling operation: Audio alarm will be provided upon detection of illegal connection of the local line at subscriber side.

(5) Simple alarm stop function: If illegal connection of subscriber local line is acknowledged by the subscriber, the audio alarm that the present invention provides will be stopped when the subscriber picks up at the hand set.

(6) Easy to install: The present invention is easy to install when voltage polarity is properly checked and the position of the present invention is properly set.

DETAILED DESCRIPTION OF THE PREFERRED EMBODIMENTS

Figure 1:
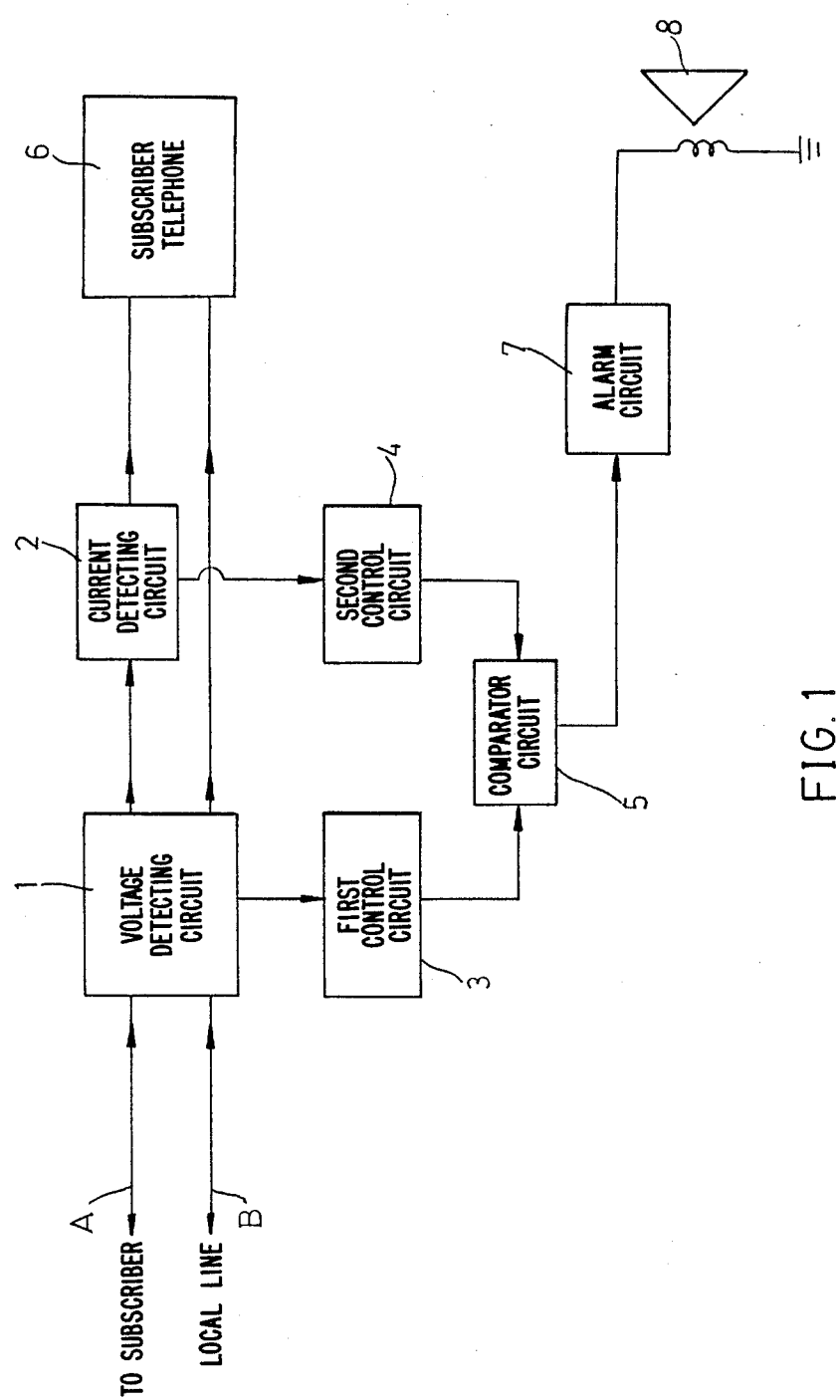
FIG. 1 is a block diagram, illustrating the function of every sub-circuit according to the present invention.

With reference to the block diagram as illustrated in FIG. 1, a multipurpose subscriber local line monitoring device is including a voltage detecting circuit (1), a current detecting circuit (2), a first control circuit (3), a second control circuit (4), a comparator circuit (5), an alarm circuit (7) and a sound generating element (8), wherein the voltage detecting circuit (1) is having its input terminals connected to the two terminals of subscriber local line (A) and (B), and the current detecting circuit (2) is connected with subscriber's telephone apparatus (6) through series connection.

Figure 2:
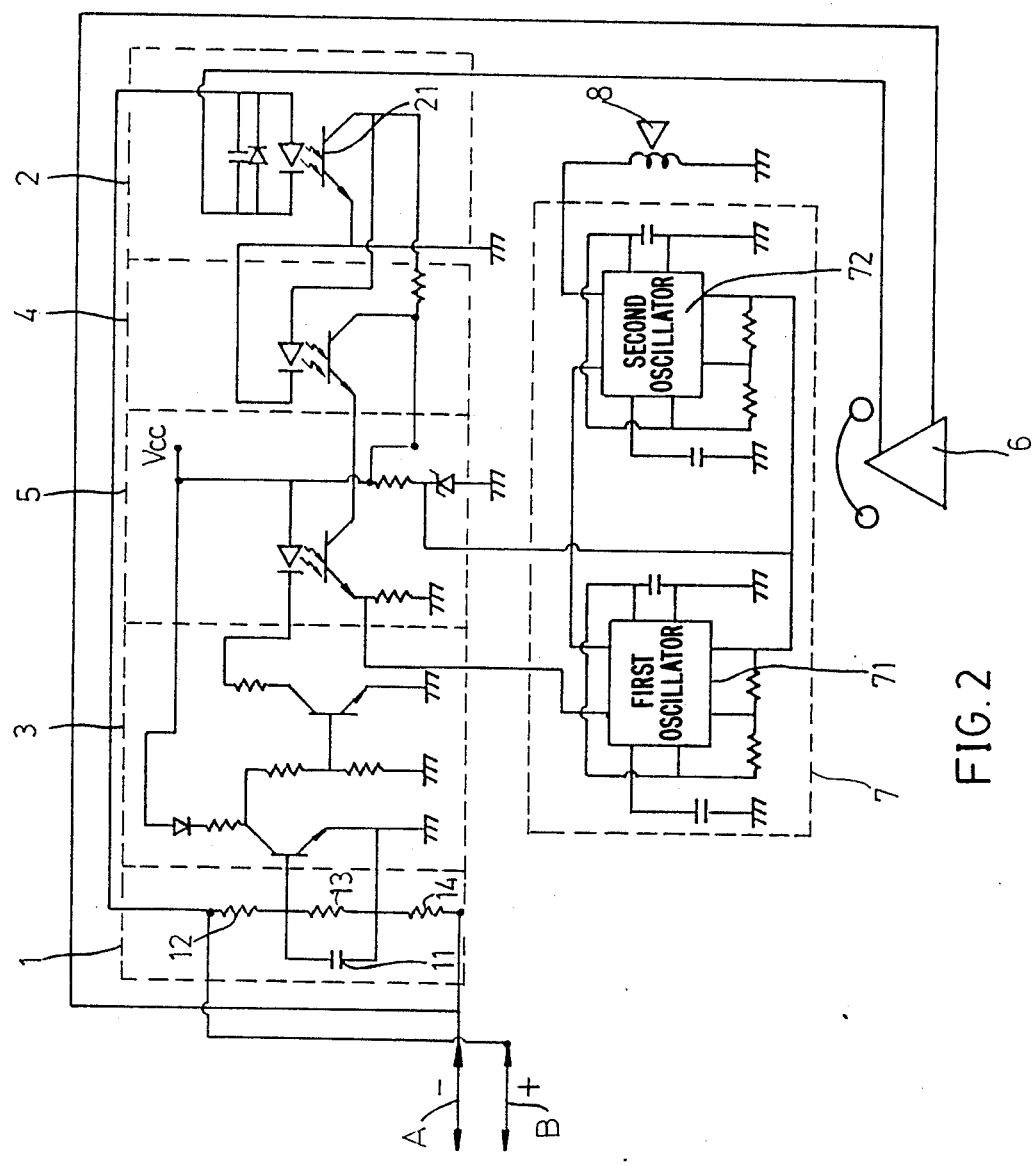
FIG. 2 is a detailed circuit diagram according to the present invention.

With reference to FIG. 2, the voltage detecting circuit (1) is comprising capacitor (11) and resistors (12), (13) and (14), wherein the capacitor (11) is in parallel connection with the resistor (13) and in series connection with the resistors (12) and (14), to further connect to the negative pole (A) of subscriber local line through series connection, and wherein the capacitor (11) and the resistor (13) are connected through parallel connection to serve as output end for further connection to the input end of the first control circuit (3). The first control circuit (3) is a voltage-to-current transfer, which transfers the voltage detected by the voltage detecting circuit (1) into a current signal. The current detecting circuit (2) is comprised of a photocoupler (21) having its input end connected to the positive pole (B) of subscriber local line and having its output end connected to the input end of the second control circuit (4). The comparator circuit (5) is to compare the output of the first control circuit (3) with the output of the second control circuit (4). When customer local line is illegally connected, the voltage detecting circuit (1) provides the first control circuit (3) with a signal to trigger the comparator circuit (5) to send a signal to the alarm circuit (7) so as to further drive the sound generating element (8) release an audio alarm to warning the subscriber. If the subscriber picks up the hand set (6) to detect when the sound generating element (8) is releasing an audio alarm signal, the current detecting circuit (2) will trigger the second control circuit (4) to stop signal output through the comparator circuit (5) so as to let the alarm circuit (7) stops its operation, and to let the sound generating element (8) stop providing audio alarm signal. The said alarm circuit (7) is comprising two oscillators, wherein the first oscillator (71) is to intermittently generate square wave signal (in the present embodiment, the cycle time is set at 2 seconds), and the second oscillator (72) is to generate a 800 HZ square wave signal. Therefore, when the alarm circuit is triggered to operate, the sound generating (8) will continously provide a 800 HZ warning sound.

When a subscriber local line is in idle condition, there is a 48 V DC voltage between the two terminals (A) and (B) of the subscriber local line. If the subscriber's local line fails in operation due line breaking or short-circuit or illegal connection by somebody else, it will be immediately detected by the voltage detecting circuit (1) and the sound generating element (8) will give an audio alarm signal accordingly. According to the present invention, the current detecting circuit (3) is to identify if the local line is under normal calling or has been illegally connected by someone else, and it does not interfere with the operation of dialing, ringing, calling of the telephone apparatus or service meter counting of the telecommunication office.

According to the present invention, the installation of the subscriber local line monitoring device is quite simple and easy if the voltage polarity is properly checked. When in installation, the present monitoring device shall be set at the front end of a telephone apparatus. If a subscriber does have an extension, data terminal, fax, or private branch exchange, the present monitoring device shall be set at the front end of the equipment what a subscriber does have available.

What is claimed is:

1. A multipurpose subscriber local line monitoring device, including:
    a voltage detecting circuit having its input end connected to a subscriber local line to detect the normal DC voltage value and to provide an output signal through its output end when the local line fails in operation due to breaking, short-circuit or illegal connection;
    a first control circuit having its end connected to the output end of said voltage detecting circuit, so as to generate a voltage signal output when an output signal is provided through the output end of said voltage detecting circuit;
    a current detecting circuit being connected to telephone apparatus through series connection to detect the subscriber local line, said current detecting circuit being to detect a current signal and being not to provide output signal when the subscriber is using the telephone apparatus or being to provide an output signal through its output end when the subscriber local line illegally connected;
    a second control circuit having its input end connected to the output end of said current detecting circuit so as to provide a voltage signal output when an output signal is provided through the output end of said current detecting circuit;
    alarm circuit being to provide an alarm signal; a sound generating element being to generate an audio alarm; and
    a comparator circuit being to compare the output signal of said first control circuit with the output signal of said second control circuit so as to trigger said alarm circuit to operate when subsriber local line fails in operation due to breaking or short-circuit;
    chacterized in that said voltage detecting circuit will be triggered to send an output signal through said first control circuit and said comparator circuit to drive said alarm circuit to trigger said sound generating element to operate when the subscriber's local line is illegally connected by someone else, and if the subscriber picks up the hand set to detect the local line when the sound generating element is releasing an audio signal, said current detecting circuit will trigger said second control circuit to stop signal through said comparator circuit so as to drive to said alarm circuit stop the operation, and to drive said sound generating element stop providing audio alarm signal.

2. The multipurpose subscriber local line monitoring device as set forth in claim 1, wherein the input end of said voltage detecting circuit is comprised of a resistor and a capacitor in parallel connection and another two resistors further connected to subscriber local line through series connection, and the both terminal ends of the loop circuit comprised of said resistors and capacitor being served as output end of the voltage detecting circuit.

3. The multipurpose subscriber local line monitoring device as set forth in claim 1, wherein said current detecting circuit is comprised of a photocoupler having its input end connected to the negative pole of the subscriber local line.

4. The multipurpose subscriber local line monitoring device as set forth in claim 1, wherein said first control circuit is a voltage-to-current transfer to transfer voltage signal received from input end into a current signal for output through output end.

* * * * *